(12) United States Patent
Silivra (10) Patent No.: US 6,690,023 B2
(45) Date of Patent: Feb. 10, 2004

(54) METHODS AND APPARATUS FOR PROVIDING A BROADBAND TUNABLE SOURCE OF COHERENT MILLIMETER, SUB-MILLIMETER AND INFRARED RADIATION UTILIZING A NON-RELATIVISTIC ELECTRON BEAM

(76) Inventor: Anissim A. Silivra, 103B Stewart Ln., Chapel Hill, NC (US) 27514

( * ) Notice: Subject to any disclaimer, the term of this patent is extended or adjusted under 35 U.S.C. 154(b) by 61 days.

(21) Appl. No.: 09/930,064

(22) Filed: Aug. 15, 2001

(65) Prior Publication Data

US 2002/0060299 A1 May 23, 2002

Related U.S. Application Data

(60) Provisional application No. 60/225,601, filed on Aug. 15, 2000.

(51) Int. Cl.$^7$ .................................................. A61N 5/00
(52) U.S. Cl. ................................. 250/492.3; 250/493.1
(58) Field of Search ........................... 250/492.3, 493.1; 372/2

(56) References Cited

U.S. PATENT DOCUMENTS 5,280,490 A * 1/1994 Conde et al. ................... 372/2

* cited by examiner

Primary Examiner—Hai Pham
Assistant Examiner—Lam Nguyen
(74) Attorney, Agent, or Firm—Priest & Goldstein, PLLC (57) ABSTRACT

Techniques for super broadband operation of a long wavelength free-electron laser (FEL) on a non-relativistic electron beam are described. Because of the physical nature of the underlying instability, a frequency region within which amplification or generation of the electromagnetic waves occurs, ranges from frequencies slightly below to many times above the resonant FEL frequency. Therefore, in this regime, the device operating frequency is determined by the frequency characteristics of a device resonator and can be tuned over a wide range without changing the electron beam energy or wiggler period. The upper limit of the frequency band is imposed by the thermal spread in an electron beam. Although this regime cannot be understood (and, consequently, was not discovered) without using the relativistic equation of motion, the regime does not rely upon relativism of an electron beam. A non-relativistic implementation of this regime in a submillimeter/THz device is advantageously described.

2 Claims, 4 Drawing Sheets

METHODS AND APPARATUS FOR PROVIDING A BROADBAND TUNABLE SOURCE OF COHERENT MILLIMETER, SUB-MILLIMETER AND INFRARED RADIATION UTILIZING A NON-RELATIVISTIC ELECTRON BEAM

RELATED APPLICATIONS

The present invention claims the benefit of U.S. Provisional Application Serial No. 60/225,601 entitled "Methods and Apparatus for Providing a Broadband Tunable Source of Coherent Millimeter Sub-Millimeter and Infrared Radiation Utilizing a Non-Relativistic Electron Beam" and filed Aug. 15, 2000.

FIELD OF THE INVENTION

The present invention relates generally to improved methods and apparatus for broadband tunable generation or amplification of coherent electromagnetic radiation at millimeter, sub-millimeter and infra-red wavelengths utilizing a non-relativistic electron beam for terrestrial, space and air-born communication, radars, semiconductor manufacturing, medical and other applications. More particularly, an electron device consisting of an electron gun for producing a non-relativistic electron beam, and techniques that are described below for creating uniform axial magnetic field $B_0$ and periodic transverse magnetic field $B_w$ within a device interaction region so that said electron beam moves along a helical trajectory with the transverse velocity $v_\perp$ and the longitudinal velocity $v_\parallel$ satisfying the following relationship $$v_\perp^2 \geq c^2 \left( \frac{\Lambda_w}{\Lambda_0} - 1 \right),$$

where c is the speed of light in vacuum, $\Lambda_w$ is the spatial period of the helical electron trajectory in the combined field (it is also the spatial period of the transverse magnetic field), $\Lambda_0$ is the spatial period of the cyclotron revolution of the electron in the axial guide field $B_0$, $$\Lambda_0 = v_\parallel \frac{2\pi mc}{eB_0},$$

$v_\parallel$ is the longitudinal electron velocity, e and m are the charge and mass of the electron, respectively.

BACKGROUND OF THE INVENTION

Broadband tunable sources of electromagnetic radiation in millimeter, submillimeter and far-infrared bands are widely sought for a number of applications such as space and airborne communication, radars, medical applications, semiconductor manufacturing and others. Recently, broadband was added to a list of requirements to be met for a number of broadband-hungry digital wireless communication and Internet related applications. Although this region of the electromagnetic spectrum cannot be labeled as unreachable with traditional vacuum or quantum electronics devices, the existing devices have low efficiency, narrow bandwidth and are not tunable. The point is that this region of spectrum is situated in between regions well occupied by vacuum electron devices such as travelling wave tubes (TWT), backward wave oscillators (BWO), klystrons and magnetrons on the mm wavelength side and solid state quantum devices on the infrared and shorter wavelength side.

Traditional vacuum electron devices, such as traveling wave tubes (TWTs), use either a slow-wave structure with the period $L \approx v_\parallel/f$, where f is the device operating frequency, or in the case of the so-called gyro-devices, a high intensity axial magnetic field $B_0$ such that electron cyclotron frequency $$\frac{eB_0}{2\pi mc} \approx f$$

is close to the device operating frequency. For the frequencies above 300 GHz (wavelength of 1 mm or shorter), a slow-wave structure with a period less than 1 mm would be required. In addition to being not technologically feasible, in such small period slow wave structures, it is impossible to realize efficient interaction of an electromagnetic field with an electron beam. In the case of gyro-devices at frequencies above 300 GHz, an axial magnetic field stronger than 10 kGs would be required which cannot currently be met in a portable device. Thus, further advance of the traditional vacuum electronics into higher frequencies (shorter wavelengths) requires development of new principles.

On the other hand, solid-state quantum devices are not efficient in this region of the spectrum because the operating wavelength is too long for quantum effects to be significant.

Among known devices, only free electron lasers (FEL) are efficient in this region. The reason for this is probably the fact that the FEL utilizes principles of quantum electronics in medium such as an electron beam which is usual for classical vacuum electronics. Thus, the essential parts of both quantum and classical electronics are combined in this device. Unfortunately, for an FEL to operate in the submillimeter region, an electron beam with the energy of at least several MeVs is needed. Consequently, neither the dimensions nor price of such an FEL are suitable for most of the applications mentioned above.

SUMMARY OF THE INVENTION

The present invention further develops FEL principles leading to the creation of novel tunable vacuum electron devices able to generate and/or amplify electromagnetic radiation in the super-wide wavelength band ranging from millimeters to far-infrared (or above 30 GHz to approximately 30 THz). The physical mechanism of such devices is close to the mechanism of the wideband regime of long wavelength FEL operation. Because of the physical nature of the underlying instability, the FEL operating frequency in this regime is not determined by the electron beam energy and wiggler field period. It has been shown that a frequency region within which an amplification or generation of electromagnetic waves occurs spans from slightly below to far above the resonant FEL frequency. Therefore, in practical implementations, the frequency band is determined by the frequency characteristics of an FEL resonator and interaction region. The frequency band can be widely tuned without changing the electron beam energy and/or wiggler period. The operating frequency band is upper limited by the thermal spread of the electron beam. Although this regime cannot be understood without using the relativistic equation of motion and, consequently, was not discovered in the classical vacuum electronics, the regime itself does not rely upon relativism of an electron beam. Thus, a non-relativistic implementation of such regime is possible.

To this end, an innovative approach for developing a source of coherent electromagnetic radiation at frequencies 30 GHz and higher is provided. Unlike traditional vacuum electron devices, the device of the present invention does not utilize a strong axial magnetic field or slow-wave structure, because it does not rely on beam-wave synchronism. Instead, it uses a principle of parametric interaction of waves in an electron beam which is successfully realized in relativistic electronics, and in particular in free-electron lasers (FELs).

A conventional FEL configuration is based on an interaction of a fast electromagnetic mode of a waveguide (usually cylindrical) with an electron beam which, under presence of combined axial guide field and helical wiggler field, moves along a helical trajectory with the spatial period equal to the period of the wiggler field, $\Lambda_w$. A beating between the electromagnetic wave and the periodic transverse electron velocity produces a periodic longitudinal force which affects the longitudinal motion of the beam (this process is usually referred to as excitation of space charge waves of an electron beam). Modulation of beam velocity eventually results in modulation of beam density which, in its turn, creates an up-frequency shifted electron current that interacts with the initial electromagnetic wave. In other words, in an FEL, a high-frequency electromagnetic wave interacts with the space-charge waves of an electron beam and the interaction is possible because electron motion is periodic in the presence of an axial and a wiggler magnetic field as discussed further below. Because of the fact that space charge waves have phase velocity close to the longitudinal velocity of the electron beam, $v_\parallel$, and the electromagnetic wave's phase velocity is practically equal the speed of light, c, the interaction is synchronous and leads to an amplification or generation of the electromagnetic wave only within a narrow frequency band near the resonant frequency $$f \approx \frac{v_\parallel}{\Lambda_w(1 - v_\parallel/c)}.$$

Apparently, the resonant frequency could be very high for a relativistic electron beam, when $v_\parallel \to c$. Unfortunately, a several MeV electron beam is required to produce millimeter wave radiation, and the operating wavelength could only be tuned at the expense of changing the electron beam energy or wiggler field period both of which are not currently realizable in any practical, portable application.

However, if a certain relation between the axial magnetic field and transverse magnetic field holds, the FEL operational frequency band greatly expands toward higher frequencies and, consequently, the operating frequency is no longer determined by the resonance formula above.

This regime features an interaction between different eigen modes of the electron beam, namely cyclotron waves and space-charge waves. Because the phase velocity of each of these waves does not depend on the frequency (in fact, it is close to the longitudinal beam velocity), a band of synchronism between waves becomes extremely broad and ranges from slightly below to far above the conventional FEL resonance frequency. The operating frequency band is determined by the electrodynamic characteristics of the device interaction region and device resonator. Thus, the electron device can be tuned within the above said band without changing the electron beam energy. The frequency band is up-limited by the thermal velocity spread in the electron beam. For a good quality electron beam, an estimated limiting frequency is on the order of 30 THz–100 THz.

Although this regime cannot be understood without using the relativistic equation of motion of an electron beam, it does not rely on the relativism of the longitudinal electron velocity. Among its other aspects, the present invention advantageously realizes this regime in a portable non-relativistic electron device.

These and other features, aspects and advantages of the invention will be apparent to those skilled in the art from the following detailed description taken together with the accompanying drawings.

DETAILED DESCRIPTION

A free-electron laser (FEL) is presently the only vacuum electron device that is tunable and can efficiently operate in the submillimeter-far-infrared wavelength band. Such operation is possible because FELs utilize a parametric synchronism of fast electromagnetic modes of a smooth waveguide with an electron beam (instead of a direct beam-wave synchronism that requires a slow-wave structure with the period approximately equal to the operating wavelength). Unfortunately, relativism of an electron beam is a huge toll for shortening of the device operating wavelength. An electron beam accelerated by at least several MeVs is needed to produce sub-millimeter radiation with an FEL. Obviously, the cost and dimensions of such a device do not suit any portable application.

However, if a certain relation between FEL parameters (such as the guiding magnetic field, the longitudinal beam velocity and the period of the magnetic field) holds, the operating frequency band of an FEL becomes extremely broad, and consequently, the operation frequency is no longer determined by the conventional FEL relation. A significant feature of this regime is that the frequency band expands towards higher frequencies. As a result, a much higher than conventional FEL frequency can be achieved without increasing the electron beam energy. In fact, the energy of the electron beam can be lowered to an unrelativistic level, which transforms the whole device into a device of traditional vacuum electronics.

The first existence of unstable solutions in a broad frequency band above the FEL resonance frequency was found under numerical solution of the FEL dispersion relation in I.B. Bernstein, and L. Friedland, Theory of the Free-Electron Laser with Combined Helical Pump and Axial Guide Fields, Phys. Rev., vol. A-23 (1981) pp. 816–823. At about the same time, broadband radiation from an FEL was registered experimentally as described in K.L. Felch, L. Vallier et al, Collective Free-Electron Laser Studies, IEEE Journ. Quantum Electronics, vol. QE-17(1981) pp. 1354–1356. In this experiment a flat output radiation spectrum over a wavelength band from 6 mm to 0.9 mm (from 50GHz to 350 GHz) was observed. The results of this experiment were misinterpreted as a consequence of a bad electron beam quality. Later a broadband regime of FEL operation was studied theoretically from a standpoint of interaction of eigen waves -of an electron beam. In the follow-up experimental generator described in Yu.B. Victorov, A.B. Draganov et al. Broadband Instability in Free-Electron Lasers, Optics Communications, vol. 79, #1 (1990) pp. 81–87, ("Victorov") a practically flat spectrum of the output radiation from 12 mm to 3.4 mm was observed with the electron efficiency of interaction of about 10%. For the chosen magnitude of the wiggler field, the broadband regime existed within a certain region of the guide field magnitude close to the so-called cyclotron resonance. It should be noted that generally accepted FEL theory predicted a resonant regime of operation for the above mentioned device in the vicinity of 8 mm (38 GHz) and was totally unable to explain an occurrence of radiation with the wavelength shorter than 7 mm using realistic assumptions of beam quality, etc. Different features related to this FEL regime have been observed in several other independent experiments.

Following Victorov, this regime features an interaction between physically different eigen modes of an electron beam, namely cyclotron waves and space charge waves. Because of the fact that the phase velocity of the participating waves does not depend on the frequency and essentially equals the longitudinal beam velocity, the range of frequencies over which the synchronism between waves holds, is extremely broad, anywhere from slightly less than the conventional FEL resonance frequency to more than 10–100 times the resonance frequency. Thus, under this regime, the device operation frequency is no longer equal to the FEL resonance frequency, but is somewhere within the broad band of the wave synchronism.

The present invention recognizes that since the nature of this synchronism does not stem from the beam relativism, it can be realized in a non-relativistic electron beam as well, thus allowing a very high operating frequency to be achieved without using a small period slow-wave structure or an extremely high magnitude of magnetic field. In other words, borrowing the principle of broadband synchronism under parametric interaction of electromagnetic waves with an electron beam from the relativistic electronics and implementing this principle in a device with a non-relativistic electron beam can result in a breakthrough of the vacuum electronics into the previously unreachable region of sub-millimeter and far-infrared wavelengths.

To address underlying physical phenomena of the present invention, let us consider a model of a transverse-uniform electron beam moving in a combined uniform axial magnetic field $B_0 = B_0 \hat{e}_z$ and periodic transverse magnetic (wiggler) field $$\mathbf{B}_\perp = B_w[\hat{e}_x \cos(k_w z) + \hat{e}_y \sin(k_w z)].$$

As is well known, in this field, electrons move along a steady-state trajectory $$\mathbf{v} = v_\perp[\hat{e}_x \cos(k_w z) + \hat{e}_y \sin(k_w z)] + v_\| \hat{e}_z. \tag{1}$$

The constants of motion, or the steady-state transverse $v_\perp$ and longitudinal velocity $v_\|$, are determined as a solution to the following system of equations $$v_\perp = \frac{\Omega_w}{\Omega_0 - \gamma k_w v_\|} v_\|, \quad v_\perp^2 + v_\|^2 = c^2(1 - \gamma^{-2}), \tag{2}$$

where $\Omega_{0,w} = eB_{0,w}/(mc)$, e, m and $\gamma$ are the electron charge, mass and relativistic factor respectively, and c is the speed of light.

The system of equations (2) has four solutions in a general case. Realizable solutions that satisfy a condition $v_\| > 0$ are shown in graph 100 of FIG. 1. Further, we will only be interested in region where $|\Delta| = |\Omega_0/\gamma - k_w v_\|| \ll \Omega_0/\gamma$.

Since electrons move along the steady state trajectory, they form a flow that can be described by the relativistic equation of motion in Euler's form (a hydrodynamic approach)

$$\left(\frac{\partial}{\partial t} + \mathbf{v}\nabla\right)\mathbf{v} = -\frac{e}{m}(1 - v^2/c^2)^{1/2}\left[\mathbf{E} + \frac{1}{c}\mathbf{v} \times \mathbf{B} - \frac{\mathbf{v}}{c^2}(\mathbf{v}\cdot\mathbf{E})\right] \tag{3}$$

One can easily verify that the solution of equations (1) and (2) satisfies the equation (3) when E=0 and $$\frac{\partial}{\partial t} = 0.$$

The electromagnetic field E, B is described by Maxwell's equations, which in this case have the form $$\frac{\partial}{\partial \mathbf{z}} \times \mathbf{B} - \frac{1}{c}\frac{\partial}{\partial t}\mathbf{E} = \frac{4\pi}{c}\mathbf{j}, \tag{4}$$

$$\frac{\partial}{\partial \mathbf{z}} \times \mathbf{E} + \frac{1}{c}\frac{\partial}{\partial t}\mathbf{B} = 0$$

where the first equation is coupled with the equation of motion through the electron current term j=−env, n is the density of the electron beam.

To find the waves that can exist in this model, the linearization procedure is used. Within this procedure all variables are presented as a sum of a steady state value and as a small perturbation:

$$n = n_0 + \tilde{n},$$

$$v = v_0 + \tilde{v},$$

$$B = B_0 + B_\perp + \tilde{B},$$

$$E = \tilde{E}, \tag{5}$$

then the system of equations is linearized with respect to the perturbations.

The resulting system of equations has a simpler form when the transverse components of the electromagnetic field and electron velocity are expressed via partial amplitudes of right-hand ($A_+ = A_x + iA_y$) and left-hand ($A_- = A_x - iA_y$) circular polarized waves.

The equations for the transverse components have the form $$\frac{\partial E_\pm}{\partial z} \mp \frac{i}{c}\frac{\partial B_\pm}{\partial t} = 0, \tag{6}$$

$$\frac{\partial B_\pm}{\partial z} \pm \frac{i}{c}\frac{\partial E_\pm}{\partial t} \mp \frac{4\pi e}{c}in_0 v_\pm = \pm \frac{4\pi e}{c}i\tilde{n}v_\perp e^{\pm ik_w z},$$

-continued $$\left(\frac{\partial}{\partial t} + v_{\|}\frac{\partial}{\partial t}\right)v_{\pm} \mp \frac{i\Omega_0}{\gamma}v_{\pm} \pm ik_w v_{\|}\frac{\gamma v_{\perp}^2}{2c^2}v_{\pm} +$$

$$\frac{e}{m\gamma}\left((1 - v_{\perp}^2/2c^2)E_{\pm} \pm \frac{iv_{\|}}{c}B_{\pm}\right) =$$

$$\frac{ev_{\perp}^2}{2\gamma mc^2}e^{\pm 2ik_w z}E_{\pm} \mp i\frac{v_{\perp}^2 \gamma^2}{2c^2}k_w v_{\|}e^{\pm 2ik_w z}\tilde{o}_{\pm} \mp$$

$$ie^{\pm ik_w z}\left(\frac{\Omega_w}{\gamma}v_z + \frac{\gamma v_{\|}v_{\perp}}{c^2}k_w v_{\|}v_z \pm \frac{iev_{\|}v_{\perp}}{m\gamma c^2}E_z\right).$$

The equations for the longitudinal components have the form $$\frac{\partial E_z}{\partial t} - 4\pi e\tilde{n}v_{\|} - 4\pi e n_0 v_z = 0, \quad (7)$$

$$\frac{\partial E_z}{\partial z} - 4\pi e\tilde{n} = 0,$$

$$\left(\frac{\partial}{\partial t} + v_{\|}\frac{\partial}{\partial t}\right)v_z + \frac{e}{m}(1 - v_{\|}^2/c^2)E_z =$$

$$\frac{ie}{2m\gamma c}\left(v_{\perp}\left(B_{-} - \frac{iv_{\|}}{c}E_{+}\right) - B_w v_{+}\right)e^{-ik_w z} -$$

$$\frac{ie}{2m\gamma c}\left(v_{\perp}\left(B_{-} + \frac{iv_{\|}}{c}E_{-}\right) - B_w v_{-}\right)e^{ik_w z}.$$

It is clearly seen that the system of equations (6) and (7) is consistent if the solution for the transverse waves is proportional to exp $i[\omega t-(k \mp k_w)z]$ and for the longitudinal waves to exp $i[\omega t-kz]$. Assuming that coupling coefficients are small enough to be neglected, participating waves can be easily identified.

The transverse waves are forward and backward electromagnetic waves (of two different polarizations) passively coupled with the fast (wave index +) or slow (wave index −) cyclotron modes of the election beam. The corresponding dispersion relation has the form $$D_{\pm} \equiv [\omega - (k \mp k_w)v_{\|} \mp k_w v_{\|}\gamma^2\beta_{\perp}^2/2][\omega^2 - c^2(k \mp k_w)^2] - \quad (8)$$

$$\omega_b^2/\gamma[\omega(1 - \beta_{\perp}^2/2) - (k \mp k_w)v_{\|}] = 0$$

where $\omega_b = (4\pi n_0 e^2/m)^{1/2}$ is the plasma frequency of the election beam. Note, that because of the transverse velocity modulation caused by the wiggler field, the wave number of the transverse waves has a parametric shift $\mp k_w$.

The longitudinal waves are space charge waves of the electron beam. The dispersion relation for them has the form $$(\omega - kv_{\|})^2 - (1 - v_{\|}^2/c^2)\omega_b^2/\gamma = 0, \quad (9)$$

In a non-relativistic case, that is central in the following consideration, this dispersion relation reduces to the well known $(\omega-kv_{\|})^2 = \omega_b^2$. The dispersion relations for all eight waves, collectively 200, are sketched in FIG. 2 to make the following consideration clearer.

Figure 2:
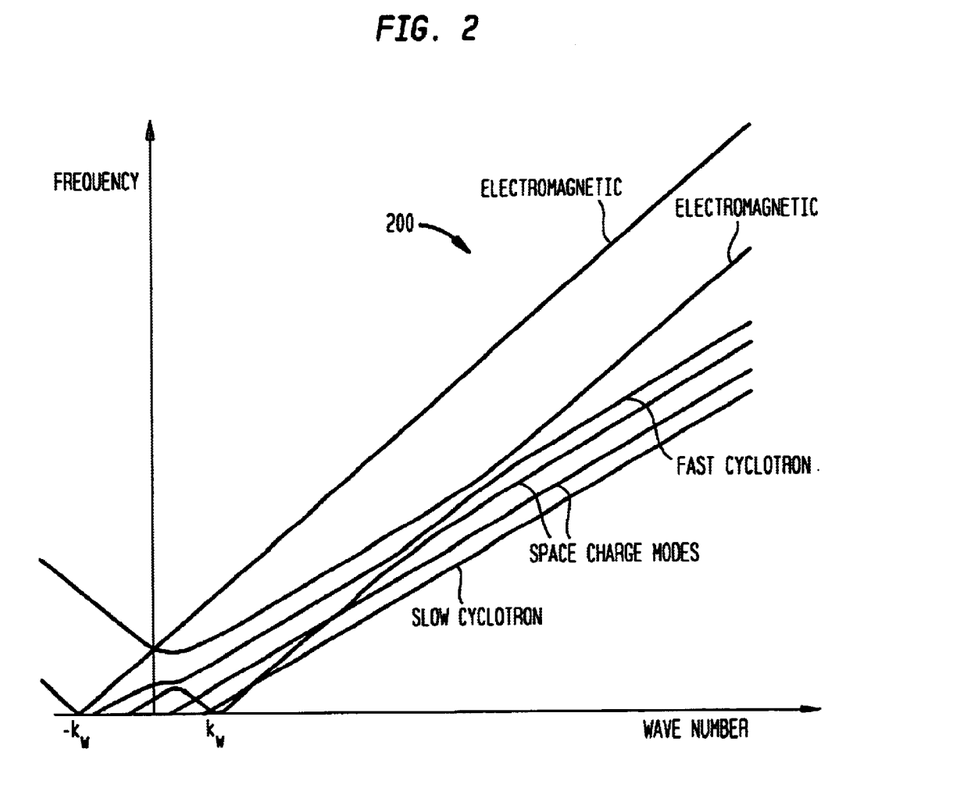
FIG. 2 illustrates the dispersion relations for waves in the system.

As is known from the general theory of waves and instabilities in plasma, points of intersection of dispersion curves for different types of waves are points in the vicinity of which a wave instability may develop. In the system under consideration, an instability may develop if one of participating waves is either the slow space charge or the slow cyclotron wave. The intersection point of space charge modes with the electromagnetic wave corresponds to a conventional FEL resonance and has been extensively analyzed elsewhere. The intersection point of the cyclotron wave with the electromagnetic wave was analyzed in A. A. Silivra, FEL on the Slow Cyclotron Wave, NIMPR, vol. A375, 1996, pp.248–251. One more and absolutely unique possibility to realize an instability in the system is to bring into synchronism the fast and slow cyclotron waves of the electron beam.

Figure 1:
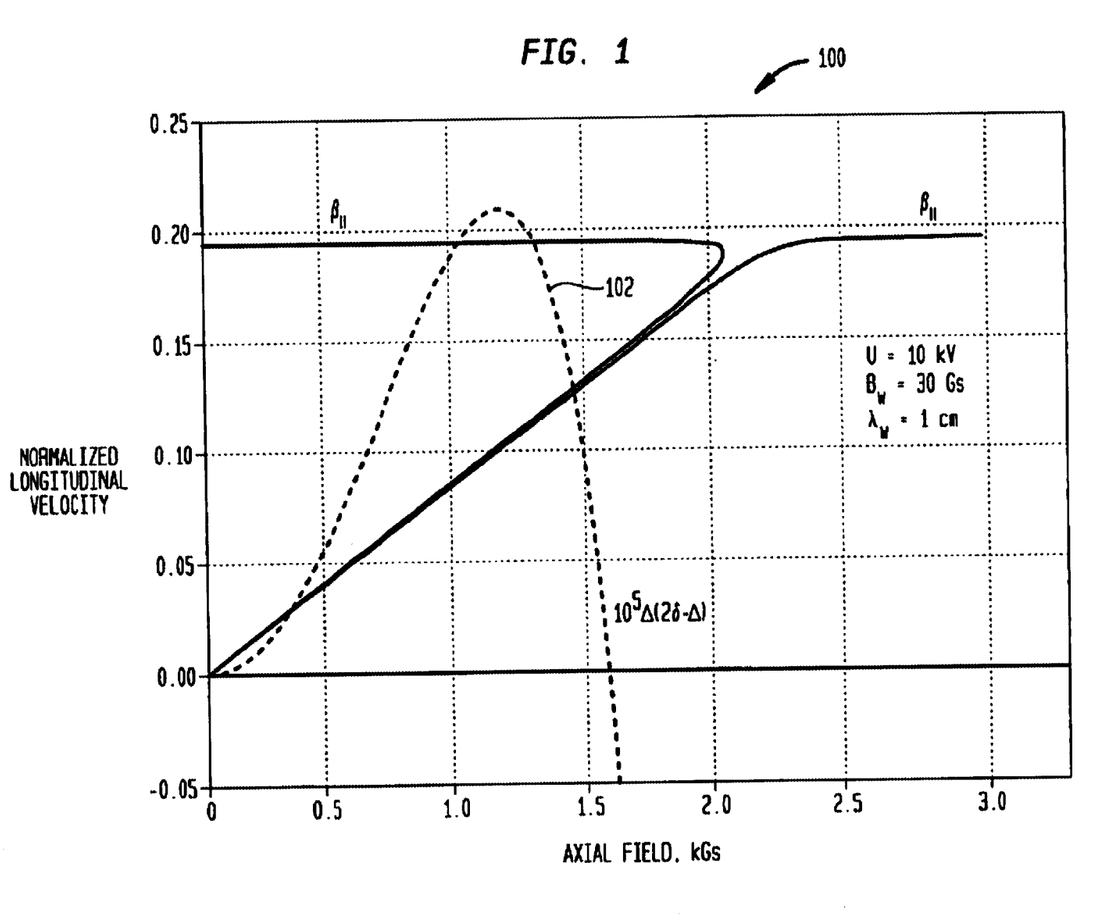
FIG. 1 illustrates realizable steady-state trajectory of non-relativistic electrons in a combined axial and wiggler field.

Usually, the frequency offset between cyclotron waves, $2\Delta$, is large enough to prevent synchronism of the cyclotron waves. In this case, the coupling between cyclotron waves is negligibly small and their dispersions may be analyzed separately similar to the case shown in FIG. 2. But the situation is quite different in the vicinity of the so-called cyclotron resonance of the transverse velocity which takes place when the electron cyclotron frequency, $\Omega_0/\gamma$, is close to the bounce frequency of electrons in the wiggler field, $k_w v_{\|}$. Thus, the denominator in the first formula (2) is small, $\Delta = \Omega_0/\gamma - k_w v_{\|} << \Omega_0/\gamma$, $k_w v_{\|}$, and the transverse velocity is relatively high, although a parameter $\beta_{\perp}^2 = v_{\perp}^2/c^{b\,2}$ is always small $\beta_{\perp}^2 << 1$. In FIG. 1, the cyclotron resonance of the transverse electron velocity takes place where the longitudinal electron velocity is represented by a steeper part of the velocity curve.

The cyclotron resonance of the transverse steady state electron velocity has a profound impact on the dispersion of the cyclotron waves. Indeed, under these same circumstances, a relativistic correction to the dispersion of cyclotron waves, $k_w v_{\|}\gamma\beta_{\perp}^2/2$, becomes significant. Although the correction is relatively small, the cyclotron wave offset $\Delta$ is also small. That is why the small relativistic correction may become large enough to significantly reduce or even fully compensate the offset of the cyclotron waves and bring them to synchronism.

To verify this statement, let us analyze the system described by equations (6) and (7) at frequencies where the plasma frequency influence on the dispersion is negligibly small, $\omega_b/\omega << 1$. An asymptotic form of the dispersion relation for the cyclotron branches of the transverse waves is the following $$\omega - kv_{\|} = \pm\Delta_{mod} \quad (10)$$

where $\Delta_{mod} = \Delta - k_w v_{\|}\gamma\beta_{\perp}^2/2$. Thus, the dispersion relations are straight lines shifted above and below the line $\omega = kv_{\|}$ by $\Delta_{mod}$. Because of the relativistic correction, the shift $\Delta_{mod}$ may become smaller than the coupling coefficient between cyclotron waves. In other words, if $$\gamma k_w v_{\|}\beta_{\perp}^2/2 \approx \Omega_0/\gamma - k_w v_{\|}, \quad (11)$$

the fast and slow cyclotron waves of the electron beam are brought into synchronism. As can be seen from FIG. 2, if the synchronism of waves results in an instability, the instability should be extremely broadband.

The simplest way to consider interaction of waves and find the instability rate is the so-called method of weakly coupled waves. Let us first neglect coupling between transverse and longitudinal waves and find the following relations between wave components:

$$B_{\pm} = \pm\frac{ic(k \mp k_w)}{\omega}E_{\pm}, \quad (12)$$

$$v_{\pm} = \frac{i\chi_{\pm}^2}{4\pi e n_0 \omega}E_{\pm},$$

where $\chi_{\pm}^2 = \omega^2 - c^2(k \mp k_w)^2$. After that, the equations for the transverse waves take the following form $$D_+ E_+ + \frac{\beta_\perp^2}{2}\left(\frac{\omega_b^2 \omega}{\gamma} + \chi_-^2 \gamma^2 k_w v_\|\right) E_- = 0, \quad (13)$$

$$D_- E_- + \frac{\beta_\perp^2}{2}\left(\frac{\omega_b^2 \omega}{\gamma} - \chi_+^2 \gamma^2 k_w v_\|\right) E_+ = 0.$$

Making the determinant of this system equal to 0 gives rise to the dispersion equation for the waves under consideration. Asymptotically, at frequencies much higher than the plasma frequency of the electron beam, the dispersion relation takes the form $$(\omega - kv_\|)^2 - \Delta_{mod}^2 = -(\gamma k_w v_\| \beta_\perp^2/2)^2 \quad (14)$$

where the term in the right hand side represents the coupling between waves. The dispersion of the waves is indeed represented by straight lines in coordinates (ω, k). If coupling between waves is stronger than the waves' offset $$(\gamma^2 \beta_\perp^2 k_w v_\|/2)^2 > \Delta_{mod}^2, \quad (15)$$

the waves become unstable with the instability rate $$-\mathrm{Im}(\omega) = \left((\gamma^2 \beta_\perp^2 k_w v_\|/2)^2 - \Delta_{mod}^2\right)^{1/2} \quad (16)$$

that does not depend on the wave frequency.

Having introduced $\delta = \gamma k_w v_\| \beta_\perp^2/2$, the coupling coefficient in equation (14) can be written in the form $\Delta(2\delta - \Delta)$. Normalized dependence of the coupling coefficient on the axial magnetic field as shown in FIG. 1 by dashed line 102 has a distinct maximum in full consistence with the experimental results of Victorov. Note, that instability may exist only if $\Delta(2\delta - \Delta) > 0$.

Figure 3:
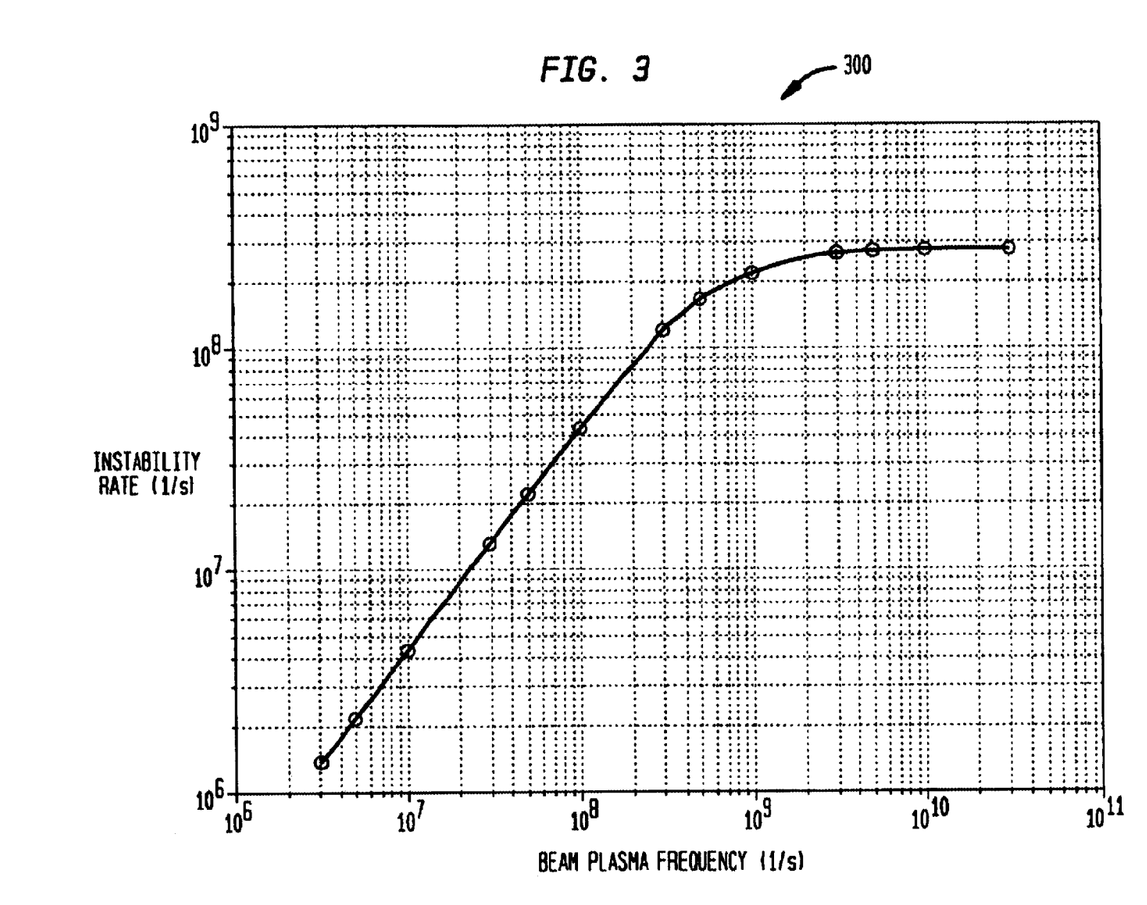
FIG. 3 shows a numerical solution of the non-reduced dispersion relation for the non-relativistic case in accordance with the present invention.

A numerical solution of the non-reduced dispersion relation obtained from equations (6) and (7) is given in FIG. 3. This solution shows the dependence of the instability rate on the beam plasma frequency which was not possible to determine in the simplified consideration above.

In the non-relativistic limit ($\gamma \to 1$) the criterion for this instability reduces to $$\beta_\perp^2 > \frac{\Omega_0}{k_w v_\|} - 1$$

which after simple transformation can be written as follows $$v_\perp^2 > c^2\left(\frac{\Lambda_w}{\Lambda_0} - 1\right),$$

where $$\Lambda_0 = \frac{2\pi mc}{eB_0} v_\|$$

is the spatial period of the cyclotron revolution of the electron. Note that both the longitudinal $v_\|$ and transverse $v_\perp$ electron velocity depend on magnetic fields $B_{0,w}$ in accordance with equations (1) and (2).

It is important to note that the instability extends towards infinitely high frequencies only within the frame of the hydrodynamic consideration developed above. A thermal velocity spread $V_T$ in the electron beam limits the frequency of the instability at $$f_{\lim} \approx \frac{\omega_b v_\|}{2\pi V_T}.$$

For high quality non-relativistic electron beams, the limiting wavelength can be as short as 10 μm.

As an example of a nonrelativistic implementation, let us consider a device with the following parameters: beam voltage U=10 kV, beam current I=100 mA, axial magnetic field $B_0$=1 kGs, wiggler magnetic field $B_w$=30 Gs, wiggler period $\Lambda_w$=1 cm ($k_w$=6.28 cm$^{-1}$). Under these parameters, the normalized transverse velocity $\beta_\perp$=0.17 and longitudinal velocity $\beta_\|$0.09, while the radius of the corresponding steady-state trajectory R=3 mm. For $\omega_b$=10$^9$ s$^{-1}$, the instability rate is $-\mathrm{Im}\omega$=10$^{-3}$ $k_w c \approx 2.2 \cdot 10^8$ s$^{-1}$ and is suitable for implementation in generators and amplifiers.

Figure 4:
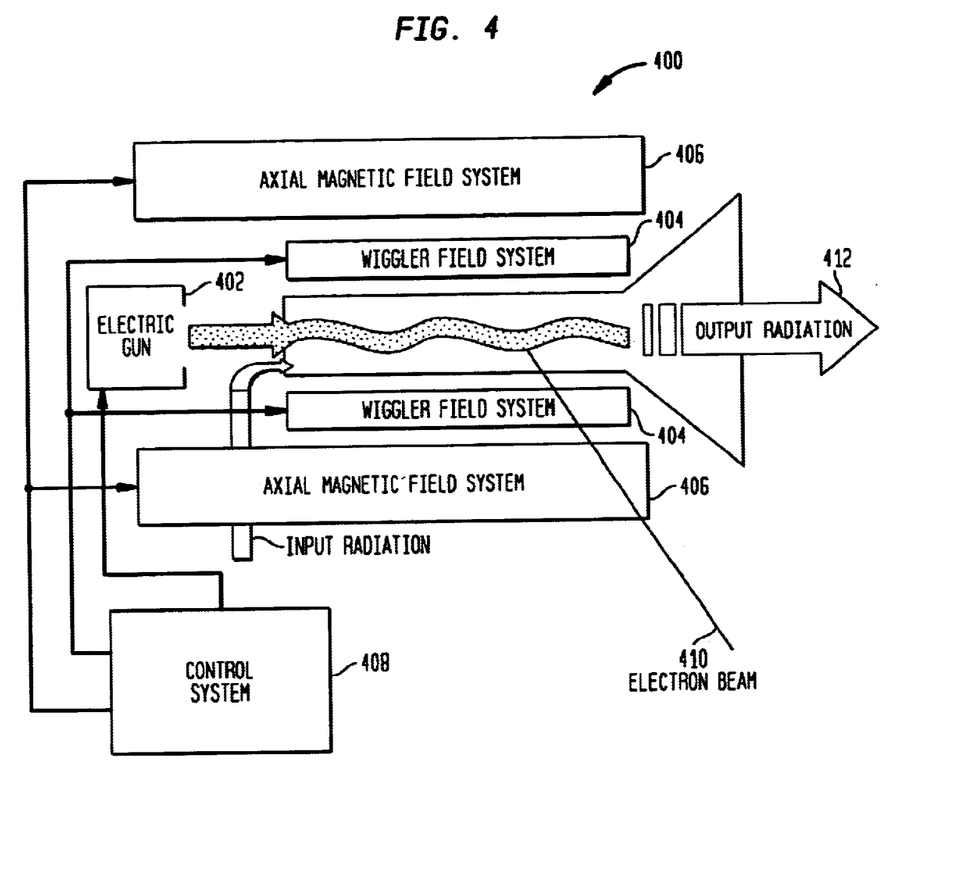
FIG. 4 shows an exemplary broadband tunable electron device in accordance with the present invention.

FIG. 4 shows an exemplary broadband tunable electron device 400 in accordance with the present invention. Device 400 comprises an electron gun, a wiggler field system 404, an axial magnetic field system 406, and a control system 408 which cooperate to control an electron beam 410 to produce output radiation 412, as discussed in detail above. Control system 408 may be suitably implemented utilizing a control processor programmed to provide control outputs to the electron gun 402, wiggler field system 404 and axial field magnetic field system 406 so that device 400 operates in the desired region.

While the present invention has been disclosed in the context of various aspects of a presently preferred embodiment, it will be recognized that many variations may be made to adapt the present teachings to other contexts consistent with the claims that follow. Simply by way of example, it is anticipated that an FEL in accordance with the present invention may find application for terrestrial, space and air-born communication, radar, medical applications, semiconductor manufacturing and other areas which will be apparent to those of skill in the art.

I claim:

1. An electron device that includes
   an electron gun for producing a non-relativistic electron beam; and
   means for creating a uniform axial magnetic field $B_0$ and a helical transverse magnetic field of wiggler $B_w$ within a device interaction region wherein the axial and transverse magnetic fields are such that said electron beam moves along a helical trajectory with the transverse velocity $v_{195}$ and the longitudinal velocity $v_{81}$ satisfying the following relation $$v_\perp^2 \geq c^2\left(\frac{\Lambda_w}{\Lambda_0} - 1\right),$$

where $v_{195}$, $v_{81}$ are the transverse and longitudinal electron velocity, $\Lambda_w$ is the spatial period of the transverse magnetic field, $$\Lambda_0 = v_\| \frac{2\pi mc}{eB_0}$$

is the spatial period of the cyclotron revolution of the electron in the axial guide field, e and m are the charge and mass of the electron respectively, c is the speed of light in vacuum.

2. A method of operating an electron device that includes an electron gun for producing a non-relativistic electron beam comprising the steps of:

creating a uniform axial magnetic field $B_0$; and creating a helical transverse magnetic field $B_w$ within a device interaction region wherein the axial and transverse magnetic fields are such that said electron beam moves along a helical trajectory with the transverse velocity $v_{195}$ and the longitudinal velocity $v_{81}$ satisfying the following relation $$v_\perp^2 > c^2 \left( \frac{\Lambda_w}{\Lambda_0} - 1 \right),$$

where $\Lambda_w$ is the spatial period of the transverse magnetic field, $$\Lambda_0 = v_\| \frac{2\pi mc}{eB_0}$$

is the spatial period of the cyclotron revolution of the electron in the axial guide field, e and m are the charge and mass of the electron respectively, c is the speed of light in vacuum.

* * * * *